United States Patent [19]

Williams

[11] 4,138,936
[45] Feb. 13, 1979

[54] COFFEE BREWING MACHINE

[75] Inventor: James T. Williams, Independence, Mo.

[73] Assignee: Rival Manufacturing Company, Kansas City, Mo.

[21] Appl. No.: 798,891

[22] Filed: May 20, 1977

[51] Int. Cl.² .................. A47J 31/10; A47J 31/56
[52] U.S. Cl. ................................ 99/282; 99/306; 219/323; 219/296
[58] Field of Search .............. 99/282, 283, 299, 300, 99/305, 306, 307, 313, 314, 315, 316; 219/309, 323, 333, 296

[56] References Cited

U.S. PATENT DOCUMENTS

| 2,829,583 | 4/1958 | Leonard | 99/305 |
| 2,926,234 | 2/1960 | Palmer | 99/305 |
| 3,552,298 | 1/1971 | Bufkin | 99/306 |
| 3,587,444 | 6/1971 | Godel | 99/282 |
| 3,693,535 | 9/1972 | Abel | 99/305 |

Primary Examiner—Robert W. Jenkins
Attorney, Agent, or Firm—Lowe, Kokjer, Kircher, Wharton & Bowman

[57] ABSTRACT

An automatic drip coffeemaker includes a removable, top mounted reservoir which delivers water in accurately controlled quantities to a small water tank. From the tank, the water flows through a tube to a heater well in which it is heated to boiling, thereby causing it to overflow the well. The hot water then flows a short distance to a spout located above a basket and spreader assembly through which it passes prior to entering a carafe which is heated by a warming plate. A control circuit serves to control the brewing and heating cycle. The water heating system also finds application for other purposes such as heating liquids for tea or soup.

12 Claims, 15 Drawing Figures

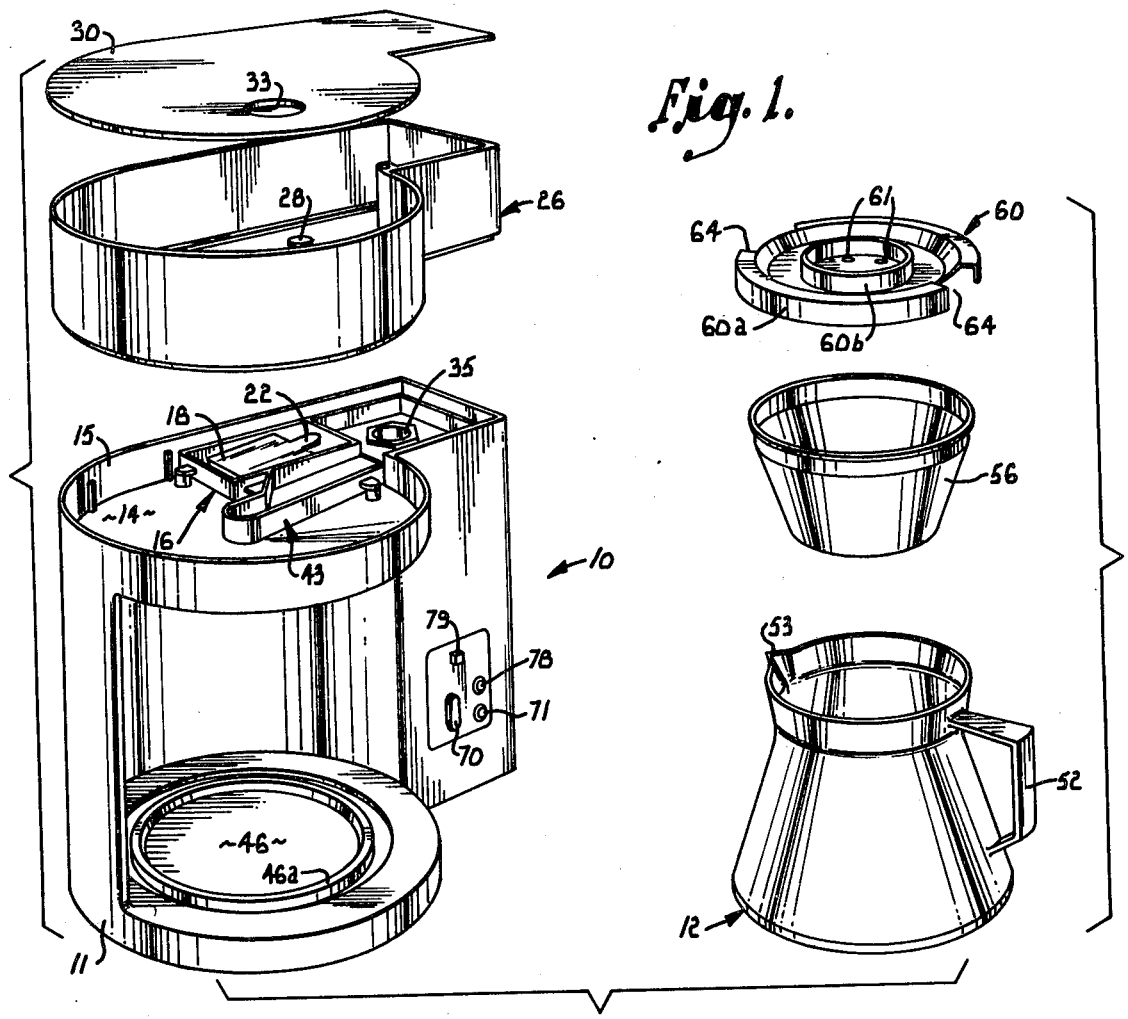

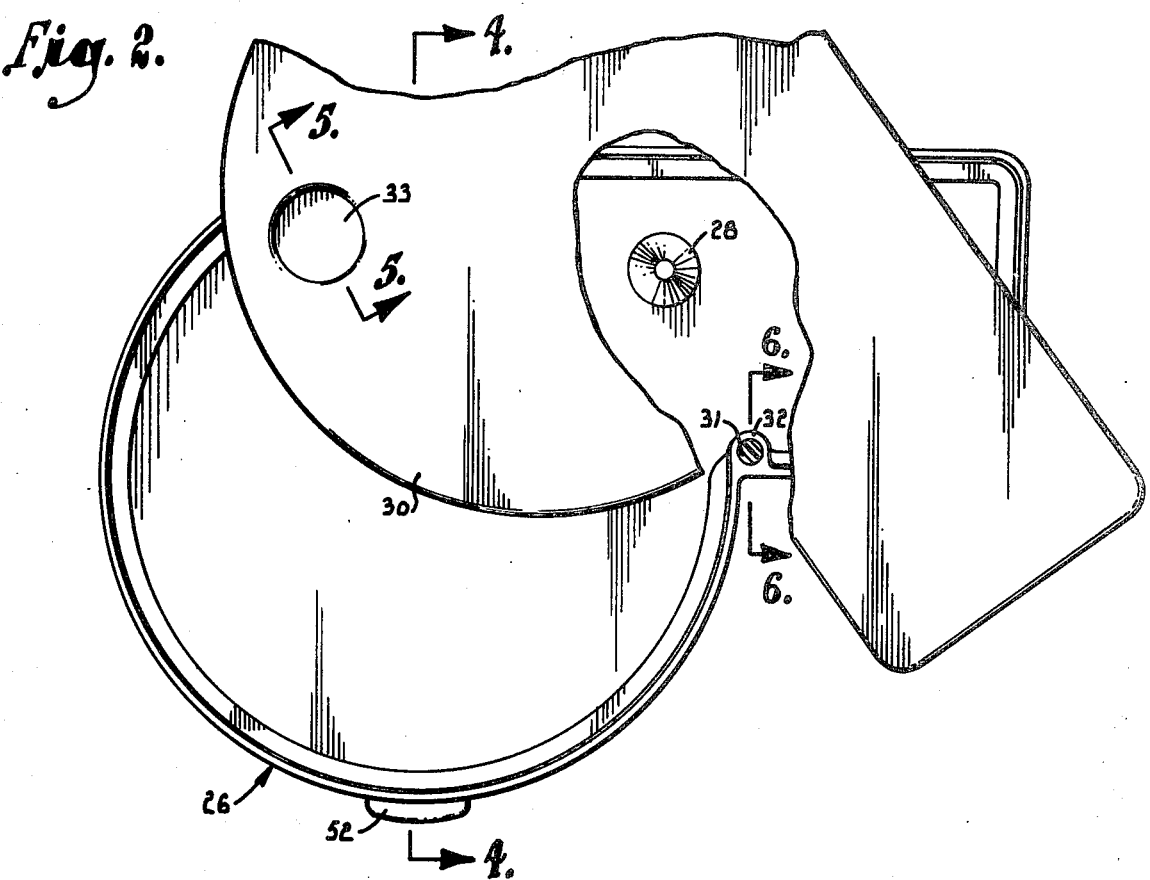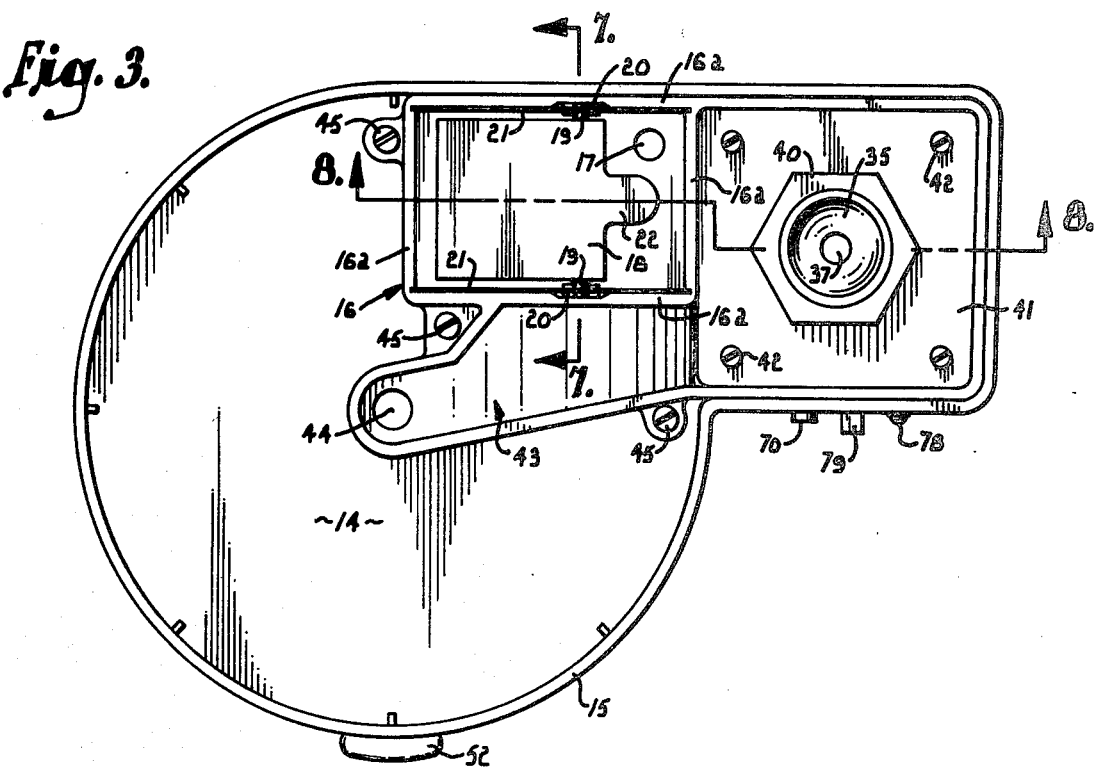

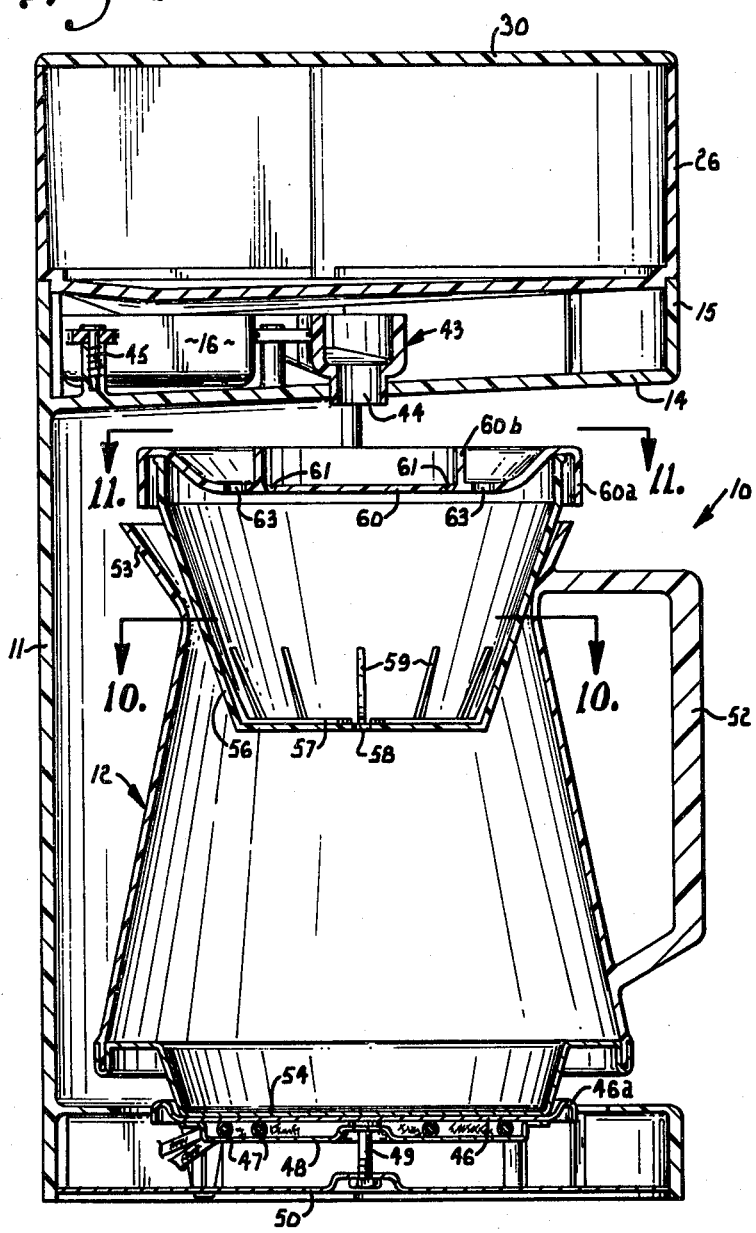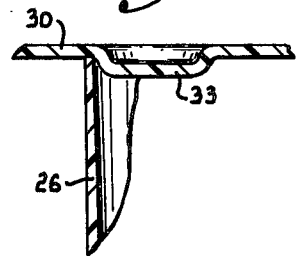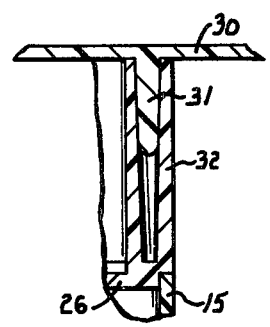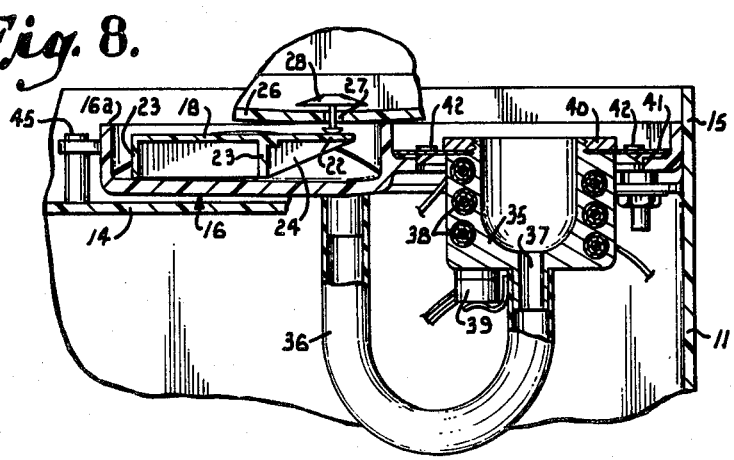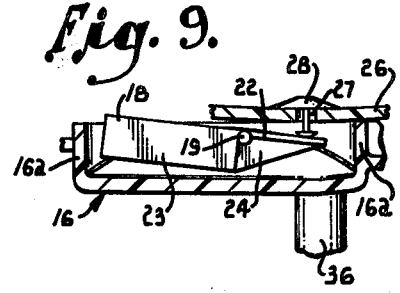

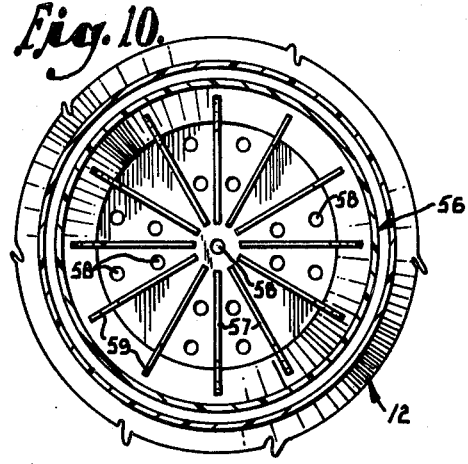
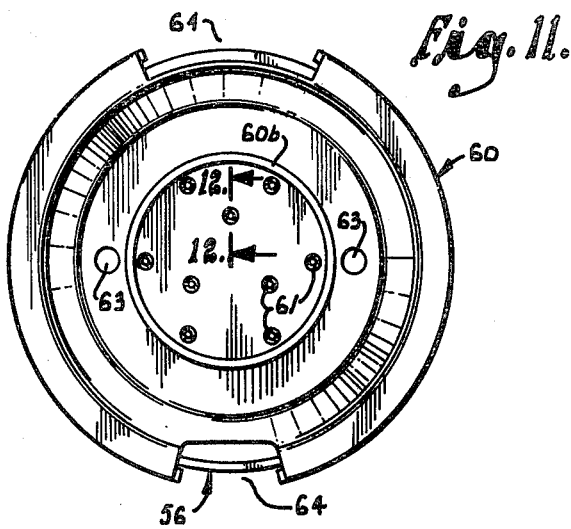
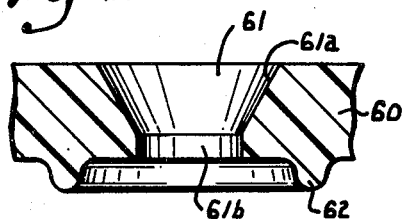
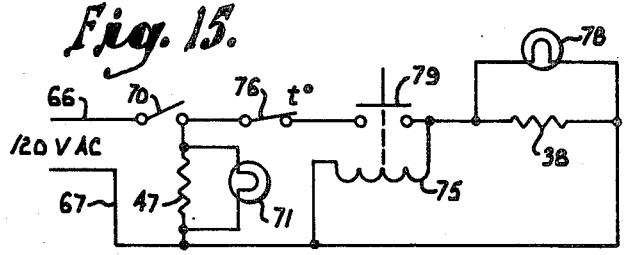
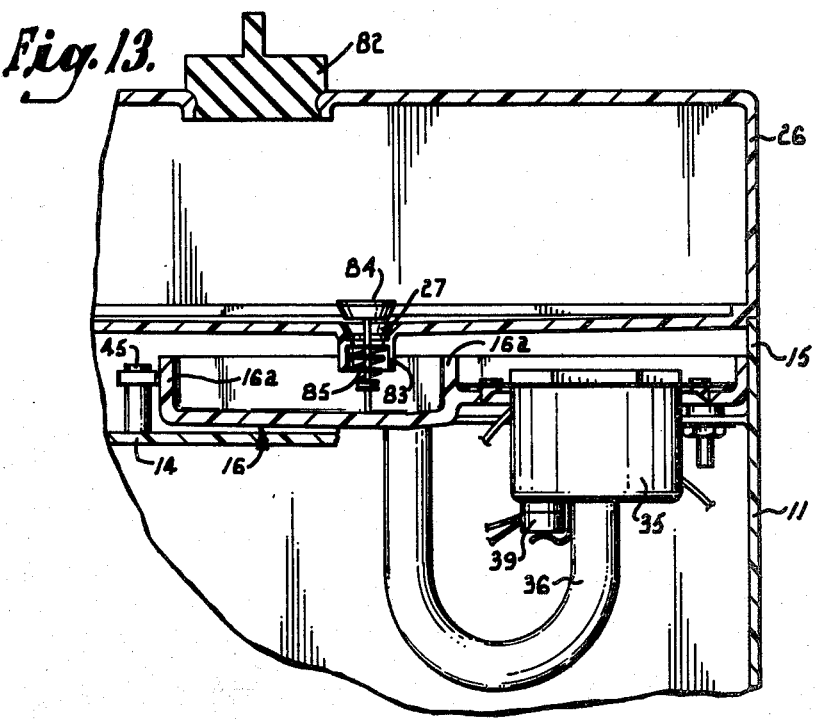

COFFEE BREWING MACHINE

BACKGROUND AND SUMMARY OF THE INVENTION

This invention relates to an improved coffee brewing machine and particularly to an improved system for heating water in such a machine and for other purposes.

Coffee brewing machines commonly known as automatic drip coffeemakers have achieved widespread popularity in recent years. In machines of this type, hot water passes through the coffee grounds a single time, and primarily for this reason, the coffee has a better flavor than is achieved with percolator type coffee pots. Even so, the coffeemakers presently available are unsatisfactory in many respects.

There are two general types of drip coffeemakers, one of which heats the water in a manner causing it to pass upwardly through a long tube. After exiting from the tube, the hot water flows to a spout which directs it into a basket filled with coffee grounds and then into a carafe or other vessel. A major problem with these devices is the tendency of minerals such as calcium to precipitate out of the hot water and collect in deposits which clog the tubes and other portions of the plumbing. Aside from impeding the flow of water through the machine and causing high pressure areas, the deposits restrict heat flow from the heat source to the water and cause inaccurate operation of the thermostatic switch which is usually provided. Therefore, substances such as vinegar must frequently be passed through the machine at regular intervals in order to break up and remove the mineral deposits. Adding to this problem is the inaccessibility of the tubes; the plumbing cannot be inspected to determine the extent to which deposits are present and/or the extent to which the vinegar has been effective in removing them.

The other general type of coffeemaker is commonly known as a flow through unit. Here, the water which is poured into the main reservoir drains slowly through a shallow tray or pan in metered amounts. In the pan is an electric heater so that the water is heated as it flows through the pan. The hot water is then directed through the grounds and into the carafe. Again, the problem of mineral deposits is encountered, although, in this case, the deposits develop in the pan and on the heater, both of which are inaccessible for inspection and cleaning. Safety problems are also encountered due to the need for a high wattage heating unit in order to apply heat to the water at the required rate.

Maximum flavor is extracted from coffee grounds when the water is as hot as possible at the time it encounters the grounds. However, in existing coffeemakers, it is typical for the water to travel a relatively long distance after it has been heated and before it passes through the grounds. Consequently, the water loses a substantial quantity of heat before it reaches the grounds, and the quality of the coffee brew suffers accordingly. Heat is also lost as the water passes through the spreader that is usually provided on top of the basket to spread the water over the grounds. Heat losses result from vaporization.

Some existing coffeemaking machines are further characterized by excessive cost and undue complexity, and by uneven distribution of water over the coffee grounds. The latter problem is particularly acute when less than the maximum amount of water is passed through the machine. The spreaders, if any, and baskets function as intended only at full capacity operation, and their effectiveness is inadequate with smaller amounts of water and coffee grounds. Smaller portions also provide less hot water.

The control systems for existing coffee brewing machines have also been less than satisfactory. Usually, a simple thermostat is provided to control the operation of the heating unit. In this type of control circuit, the heater is able to cycle on and off at frequent intervals as fluctuating temperatures are sensed by the thermostat. It is also common for dry cycling of the machine to occur due to inadvertent positioning of the on-off switch to the "off" condition in the absence of water.

There are a number of other situations in which liquids must be heated to a high temperature and then delivered into a container. For example, liquids must be heated in order to prepare beverages and foods such as tea, soup, and the like. Devices which have been developed for applications such as these suffer from many of the same problems and drawbacks as coffeemakers, particularly the buildup of mineral deposits which are not easily detected and removed.

It is an object of the present invention to provide an improved coffee brewing machine which has a simplified and economical plumbing system and which minimizes the problem of mineral deposits. In this respect, it is important to the invention that the hot water travels only a short path and that this path is readily accessible for visual inspection and for easy cleaning if mineral deposits are detected.

Another object of the invention is to provide an improved system for quickly heating water to a high temperature and delivering it to a container. The short path which the hot water travels is also significant in this regard because it minimizes heat losses, thus making the heating system useful in various types of devices such as coffeemakers and water heaters for tea, soup and the like.

It is still another object of the invention to provide, in a coffee brewing machine, an improved water spreader which minimizes heat losses via vaporization, while promptly and uniformly distributing hot water through the coffee grounds in a manner to evenly saturate them.

Yet another object of the invention is to provide, in a coffee brewing machine, an improved brewing basket for holding the coffee grounds.

A further object of the invention is to provide a coffee brewing machine which includes means for accurately controlling the water flow in accordance with the rate at which it is heated.

An additional object of the invention is to provide, in a coffee brewing machine of the character described, a reservoir that may be removed from the machine in order to receive water directly from a faucet or other source.

A still further object of the invention is to provide, in a coffee brewing machine of the character described, an improved control circuit which acts to prevent inadvertent dry operation and on and off cycling of the machine.

Yet another object of the invention is to provide a coffee brewing machine of the character described which functions effectively at full capacity and also at lesser capacities.

A further object of the invention is to provide a coffee brewing machine of the character described which is constructed simply and economically and which operates safely.

Other and further objects of the invention, together with the features of novelty appurtenant thereto, will appear in the course of the following description.

DETAILED DESCRIPTION OF THE INVENTION

In the accompanying drawings which form a part of the specification and are to be read in conjunction therewith, and in which like reference numerals are employed to indicate like parts in the various views:

FIG. 1 is an exploded perspective view illustrating a coffee brewing machine constructed according to a preferred embodiment of the present invention;

FIG. 2 is a top plan view of the machine, with the reservoir cover in an open position and partially broken away for illustrative purposes;

FIG. 3 is a top plan view of the machine with the reservoir removed;

FIG. 4 is a sectional view taken generally along line 4—4 of FIG. 2 in the direction of the arrows;

FIG. 5 is a fragmentary sectional view taken generally along line 5—5 of FIG. 2 in the direction of the arrows;

FIG. 6 is a fragmentary sectional view taken generally along line 6—6 of FIG. 2 in the direction of the arrows;

FIG. 7 is a fragmentary sectional view taken generally along line 7—7 of FIG. 3 in the direction of the arrows;

FIG. 8 is a fragmentary sectional view taken generally along line 8—8 of FIG. 3 in the direction of the arrows, and showing the reservoir valve in the open position;

FIG. 9 is a fragmentary sectional view similar to FIG. 8, but showing the reservoir valve in the closed position;

FIG. 10 is a sectional view taken generally along line 10—10 of FIG. 4 in the direction of the arrows;

FIG. 11 is a top plan view of the spreader plate taken generally along line 11—11 of FIG. 4 in the direction of the arrows;

FIG. 12 is a fragmentary sectional view on an enlarged scale taken generally along line 12—12 of FIG. 11 in the direction of the arrows;

FIG. 13 is a fragmentary sectional view taken on a vertical plane and illustrating an alternative embodiment of the invention;

FIG. 14 is a schematic of a preferred control circuit for the coffee brewing machine; and FIG. 15 is a schematic of an alternative control circuit for the coffee brewing machine.

Referring now to the drawings in detail and initially to FIG. 1 in particular, numeral 10 generally designates a coffee brewing machine constructed according to a preferred embodiment of the invention. Support for the structural and operating components of the machine is provided by a shell 11 which is preferably a hard plastic substance. A semicylindrical portion of the shell is open at the front in order to receive a carafe 12 from which the coffee is served. A generally rectangular closed portion of the shell projects to one side of the curved portion.

Referring additionally to FIG. 3, the shell has a flat, solid roof 14 which is bounded by a continuously extending wall 15 which is essentially an upward extension of the shell wall. Located on top of roof 14 is a small rectangulr water tank 16 which is open at the top and which is bordered by upstanding walls 16a. An outlet port 17 is formed in the floor of tank 16.

A float 18 acts to detect changes in the water level in tank 16. The float is pivotally mounted in the tank by means of a pair of horizontal stub axles 19 which project from its opposite sides. The stub axles 19 are pivitally received in bearings 20 which are formed on opposite walls 16a of the tank. Curved spring wires 21 extend along walls 16a over the top of bearings 20 to prevent axles 19 from being displaced upwardly out of the bearings.

The body portion of float 18 is substantially rectangular in shape, and it is unbalanced with respect to its pivot axis (stub axles 19), with the majority of the weight of and surface area of the float located on one side of the axis (the left side as viewed in FIG. 3). The float includes a tab portion 22 which projects from the float body on the opposite or right side of the pivot axis. As best shown in FIGS. 7-9, the underside of the float body has four peripheral flanges 23 which extend downwardly in order to define an open bottomed area beneath the float which captures air for buoyancy. A gusset 24 extends from the underside of tab 22 to connection with one of the flanges 23 for reinforcing purposes. The weight distribution of float 18 normally maintains it in the stable position of FIG. 8, with one of the flanges 23 engaging the bottom of tank 16.

Water is delivered to tank 16 from a relatively large reservoir 26 (see FIG 1) which is removably supported on top of the machine. The bottom of the reservoir is recessed around the edges so that it is able to firmly seat on top of wall 15 (FIG. 4). The floor of reservoir 26 is provided with an outlet port 27 (FIG. 8) through which the water passes into tank 16 in quantities controlled by a valve 28. Reservoir 26 is preferably formed of a hard plastic transparent substance.

The valve 28 has a vertical stem which extends through port 27. Carried on top of the stem is an enlarged valve head which seals off port 27 when it rests on the reservoir floor, as shown in FIG. 9. The enlarged lower end of the valve stem cooperates with tab 22 of the float in a manner that will be explained in greater detail.

A flat cover 30 normally covers the top of reservoir 26. With reference to FIGS. 2 and 6, a pin 31 projects downwardly from the cover and is received in a bore formed in a thickened portion 32 located at the edge of the reservoir. Cover 30 may be pivoted about the vertical axis of pin 31 between a closed position completely overlying the top of the reservoir an an open position (FIG. 2) wherein water may be added to the reservoir. A boss 33 (FIG. 5) on the underside of the cover engages the edges of the reservoir to limit the extent to which the cover may be pivoted. A finger or thumb may be placed in the recessed area above boss 33 to facilitate opening and closing of the cover.

The water in tank 16 is delivered to an open topped heating well 35 through a flexible tube 36 (FIG. 8) which is preferably silicon or a similar substance. Tube 36 is in the general shape of a "U", being connected at one end with the outlet port 17 of tank 16 and at the other end with an opening 37 at the bottom of the heating well 35. An electrical heater wire 38 extends through the body of the heating well in coiled fashion in order to apply heat to the water contained in the well. A thermostat 39 mounted on the underside of the heating well controls the application of current to the heatr wire, as will be explained more fully.

The heating well 35 is located to one side of tank 16. A large nut 40 secures the well body to a float plate 41 which is in turn secured in place by screws 42 (FIG. 3). The body of float 18 is at approximately the same level as the upper brim of heating well 35. The compartment in which well 35 is located connects with an open topped trough 43 which slopes downwardly to a spout 44. The spout is located centrally on the circular portion of roof 14 at the lowest point of the trough floor. Tank 16, trough 43, and the compartment which contains heating well 35 are preferably included on a single molded part which is secured to the top of the shell by screws 45.

The carafe 12 may be positioned below spout 44 on top of a metal warming plate 46 mounted at the base of the shell. The warming plate has an upturned ring portion 46a within which the bottom of the carafe is closely received. Located below the warming plate is the electrical heating element 47 (FIG. 4) of a "rope" type heater. Heating element 47 is contained within a shroud 48 which is mounted to the underside of warming plate 46. A screw 49 extends from the warming plate through shroud 48 and bottom cover 50 in order to secure the warming plate and shroud in place.

Carafe 12 preferably has a transparent plastic body equipped with a handle 52 and a pouring spout 53. The bottom of the carafe is preferably a plate 54 made of aluminum or another metal having a high thermal conductivity. The plate 54 is stake rolled and sealed in leakproof fashion to the lower edge of the plastic carafe body. The plate is also formed in a manner to seat closely within the warming plate ring 46a, and it presents a flat underside which seats flushly on top of the flat surface of warming plate 46. Metal such as aluminum is preferred on the bottom section of the carafe because it can easily and accurately be shaped to assure a close fit within ring 46a and maximum surface area contact with the warming plate, while its thermal conductivity is substantially greater than that of glass or other materials which are conventionally used. Consequently, the warming plate requires less power to maintain the coffee in the carafe at the desired temperature.

A frusto-conical brew basket 56 holds the coffee grounds, which may be contained in a standard paper filter cup (not shown) having a shape generally conforming with that of the basket. As shown in FIGS. 4 and 10, the floor of the basket is provided with a plurality of ribs 57 which extend generally radially. A plurality of small openings 58 are formed through the basket floor between the ribs and at the center. The sloping interior wall surface of basket 56 has a plurality of vertical ribs 59 which extend upwardly from the bottom ribs 57. Ribs 59 gradually taper as they extend upwardly on the basket. The ribs terminate at approximately ⅜ the height of the basket.

A plate type spreader 60 which covers basket 56 acts to distribute the water evenly onto the coffee grounds. The spreader has a peripheral downturned skirt 60a which fits rather closely around the top of the basket. An upstanding ring 60b projects upwardly from the flat, horizontal upper surface of the spreader at a location well inwardly of its periphery. Within ring 60b, a plurality of apertures 61 are formed through the spreader. As best shown in FIG. 12, each aperture 61 has a flared inlet 61a which tapers down to a smaller diameter portion 61b. A downwardly projecting ring 62 is formed on the underside of spreader 60 at a location outwardly of and concentric with the outlet of each aperture 61.

Apertures 61 are distributed substantialy uniformly on the plate area within ring 60b, which serves as a barrier to prevent excessive outward flow of the water contacting the spreader. A pair of relative large openings 63 are formed through spreader 60 outwardly of ring 60b to provide outlets for water which may overflow the ring and to vent gases resulting from infusion.

Spreader 60 also serves as a cover for carafe 12 to prevent escape of heat while the coffee is being kept warm. Skirt 60a is able to fit closely around the upper rim of the carafe, and cutout portions 64 accommodate the handle 52 and spout 53 when the spreader serves as a cover for the carafe.

FIG. 14 illustrates a control circuit which controls the brewing cycle of the machine. A pair of conductor lines 66 and 67 lead to a plug (not shown) which may be plugged into an electrical outlet to supply power to the circuit. Conductor 67 leads to a node 68 from which conductor 69 extends to an on-off slide switch 70. When in the "on" position, switch 70 connects line 69 with the heating element 47 of the warmer plate and with an indicating light 71 which is in parallel with element 47. Line 72 leads from the heating element and light to connection with line 66.

When switch 70 is in the "on" position, it also connects line 69 with a line 74 that includes a relay coil 75 and a thermostatic switch 76 of thermostat 39. Switch 76 is normally closed but opens when the temperature of the heating well 35, as sensed by the thermostat, is above a preselected level. Line 74 terminates at a node 77. Heater wire 38 of the heating well is tied between nodes 68 and 77 and is arranged in parallel with an indicator light 78.

Coil 75 has a relay switch 79 which is located in a line 80 that extends from node 77 to connection with line 66. The relay switch 79 is normally open, although it may be depressed manually to a closed position. Once it has been closed, the relay switch remains closed as long as coil 75 is energized. When the coil is deenergized, switch 79 automatically opens and must be manually depressed again in order to allow the coil to hold it in the closed position. This circuitry allows use of pilot duty (less than one amp.) switches 70 and 76. Switches 70 and 79 and lights 71 and 78 are located on a panel at the front of the machine, as shown in FIG. 1.

Alternate circuits, without pilot duty capability are possible. One such alternative circuit which has switches 70 and 76 in line 6 and which provides certain control and safety advantages will be described hereinafter.

To brew coffee, coffee grounds are inserted in basket 56 in the proper quantity, preferably in a paper filter cup (not shown). Spreader 60 is fit on top of carafe 12 as shown in FIG. 4. The carafe is then placed on warming plate 46.

Reservoir 26 may be removed from the machine and held under a water faucet with its cover 30 open. Alternatively, the reservoir may remain on the machine and water may be poured into it from another vessel. In either case, engagement of tab 22 with valve 28 opens the valve when the reservoir is in place on the machine. The valve remains in the open position shown in FIG. 8 until the water in tank 16 rises to the level of the body of float 18. The buoyant force of the water on the float and the captured air within flanges 23 then causes the float to pivot about its pivot axis. Such pivotal movement of the float carries tab 22 donwardly far enough so that valve 28 drops to its closed position (FIG. 9)

wherein port 27 is closed. In this manner, the water level in tank 16 is continuously maintained at the depth of the float body, which is at substantially the same elevation as the brim of heating well 35. When water flows out of tank 16, the resultant pivotal motion of float 18 raises tab 22 and causes valve 28 to open, thus supplying additional water to the tank.

The brewing cycle is initiated by first sliding switch 70 to the "on" position and then depressing (closing) switch 79. The warmer plate heating element 47 and its indicator light 71 receive current immediately on closing of switch 70, while closing of switch 79 closes the circuit which includes heater wire 38 and its indicator light 78. Since the thermostatic switch 76 is closed, the relay coil 75 is energized and is thus able to maintain switch 79 in the closed position, which is a "hold" condition.

The water contained in heater well 35 is quickly heated to boiling temperature by the heat which is applied to the well by heater wire 38. Since the water level is maintained substantially at the top of the heating well, the hot water boils and gushes in a manner to overflow out of the well and over its brim. The hot water then flows along the inclined floor of trough 43 to spout 44, through which it falls onto the spreader 60. As hot water overflows well 35, additional cold water flows to the bottom of well 35 through tube 36, and this additional water is thereafter heated until it gushes out of the well.

The hot water from spout 44 falls on the relatively small area of spreader 60 located within ring 60b, which restricts the outward flow of the water. The hot water then promptly flows through apertures 61 in substantially equal amounts so that the water is distributed evenly over the coffee grounds contained in basket 56. After passing through the coffee grounds, the then coffee brew flows through openings 58 into the carafe, where it is kept warm by the rope heating element 47 of the warmer plate.

After all of the water in reservoir 26 has passed through the machine, heating well 35 will have boiled itself dry, and the rapid temperature rise of the well is sensed by the thermostat 39 which acts to open its switch 76. As a result, coil 75 is deenergized, and its switch 79 opens to cut off the current flow to heater wire 38. The main heater is thus turned off, although the warmer plate heating element 47 remains on since switch 70 remains in the closed position. Any subsequent temperature variations have no effect on the machine because it is necessary for switches 70, 76 and 79 to all be closed in order to apply current to heater wire 38. It is necessary to intentionally depress switch 79 to again activate the main heater, and automatic shutoff is achieved any time the temperature of the heating well is excessive. The main heater and all other components can be switchd off at any time by moving switch 70 to the "off" position.

Since the water is heated to substantially the boiling temperature in well 35 and it thereafter travels only a short distance before it reaches the coffee grounds, the water is hot enough at the time it encounters the grounds to effect optimum infusion. The only portions contacted by the hot water are well 35, plate 41 and trough 43, and these areas are all open to view either with the transparent reservoir 26 on the machine or removed therefrom. Therefore, any buildup of mineral deposits is readily detected. With the reservoir removed, all of these open areas are easily accessible for cleaning to remove minerals and other substances. Steam or vapor in the machine condenses on the underside of reservoir 26 so that it is not released to the surrounding area in any significant amount. As an added benefit, the water at the bottom of the reservoir is preheated by this steam and vapor.

The small surface area of the spreader 60 which is contacted by the hot water is important in minimizing heat losses and vaporization. The rings 62 which surround apertures 61 assist in achieving even distribution of the water over the coffee grounds. Water that may collect on the underside of the spreader drips off when it encounters one of the rings 62, and the rings thus insure good spreader pattern for best infusion.

The frusto-conical shape of the basket is also important because it results in the coffee grounds having a substantial depth even when only a few cups of coffee are being brewed. In addition, there is sufficient room in the basket above the grounds to allow for expansion and foaming without overflow. Good coffee brewing is thus attained both at full capacity and at lesser capacity operation.

The bottom ribs 57 of the basket locate the paper filter (not shown) above the basket floor so that free flow of coffee out the bottom of the filter may take place. Moreover, the tapered side ribs 59 maintain the lower side walls of the filter inwardly of the basket walls so that coffee is also able to pass through the sides of the filter, thereby resulting in a larger effective surface area for the filter than would otherwise be presented.

FIG. 13 illustrates an alternative embodiment of the invention in which the only change is in the means which maintains a constant water level in tank 16. In this embodiment, float 18 and valve 28 are eliminated and the reservoir 26 is an airtight container sealed at the top by a closure 82. An outlet port 27 at the bottom of the reservoir has a mouth portion 83 which projects below the reservoir around the port. Mouth 83 extends into tank 16 and terminates at the same elevation as the brim of well 35. A valve 84 is urged by a compression spring 85 toward a closed position wherein port 27 is closed by the valve.

In use, the reservoir is removed, the closure 82 is removed, and reservoir 26 is filled with water prior to replacing the closure. Spring 85 maintains port 27 closed when the reservoir is removed and filled with water. However, when reservoir 26 is in place on top of the machine, valve 84 is maintained at an open position due to contact of its stem with the floor of tank 16. Mouth 83 provides the sole access for air to enter reservoir 26 to displace water. Water thus flows through port 27 into the tank until the water level rises sufficiently to submerge the lower end of mouth 83. When this occurs, air can no longer enter the mouth in order to displace water in the reservoir, and the water flow out of the reservoir stops. When the water level in tank 16 drops below mouth 83, air can again enter the mouth to displace water in the reservoir. Flow out of the reservoir thus resumes. In this fashion, the water level of tank 16 is maintained at the lower end of mouth 83, in order to continuously maintain well 35 full. In all other respects, the embodiment shown in FIG. 13 is identical with that of FIGS. 1–12.

It is to be understood that water may be supplied to the water tank 16 other than by a gravity flow system. For example, a mechanical or electromechanical pump may be employed to pump water into the tank in the desired amounts with the level controlled by an overflow standpipe system. The water heating system incorporated in the coffee brewing machine is useful for heating water for other uses such as for tea, soup and the like. Accordingly, it is within the scope of the invention to use the water heating system for such purposes as well as for others in which it finds application.

FIG. 15 illustrates an alternative control circuit which is without pilot duty capability but which provides advantages with respect to control and safety. In the alternative circuit, essentially the same components are included, although they are rearranged as compared to the FIG. 14 circuit. As shown in FIG. 15, switches 70, 76, and 79 are arranged in line 66 in series with one another and with heater wire 38, which is again in parallel with its indicator light 78. The warmer plate heating element 47, which is in parallel with its indicator light 71, is connected between lines 66 and 67, joining the former at a location between switches 70 and 76. The relay coil 75 is likewise tied between lines 66 and 67, connecting with line 66 at a location between switch 79 and wire 38. The circuit shown in FIG. 15 operates to control the operation of the brewing cycle in essentially the same manner as does the FIG. 14 circuit discussed previously.

From the foregoing, it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, I claim:

1. A machine for brewing coffee and the like, comprising:
    a frame;
    a heating well supported on said frame;
    means for supplying water to said heating well, said water supplying means including a reservoir on said frame adapted to receive a supply of water and having an outlet for discharging water;
    a water tank on the frame located to receive water from the outlet of said reservoir;
    flow control means for controlling the passage of water through said outlet in a manner to substantially maintain a preselected water level in said tank;
    a conduit extending from said tank to said heating well to deliver water to the latter;
    said flow control means including a float member in said tank operable to detect when the water level in the tank is above said preselected level;
    said float member is mounted in said tank for pivotal movement about a generally horizontal axis and is normally disposed in a stable position wherein said valve means acts to maintain said outlet open to flow;
    said float member presents more surface area on one side of said axis than on the other side thereof, whereby said float pivots away from its stable position when the water level in said tank is above said preselected level;
    said valve means acts to substantially close said outlet in response to pivotal movement of said float member away from its stable position;
    heating means associated with said heating well for heating the water therein to substantially the boiling temperature, thereby effecting overflow of hot water out of said well;
    a downwardly inclined surface on said frame located to receive the hot water overflowing said heating well;
    a spout opening in said surface for discharging hot water therefrom in a generally downwardly direction;
    a carafe for receiving coffee located generally beneath said spout opening; and
    a container for coffee grounds located between said spout opening and carafe to receive hot water from said opening and direct coffee into the carafe.

2. The invention set forth in claim 1 wherein the means for supplying water includes:
    a water reservoir on said frame adapted to receive a supply of water;
    conduit means for delivering water from said reservoir to said heating well; and
    means for controlling the flow of water through said conduit means in a manner to maintain a substantially constant water level in said heating well.

3. A machine for brewing coffee and the like comprising:
    a frame;
    a heating well supported on said frame;
    means for supplying water to said heating well, said water supplying means including, a reservoir on said frame adapted to receive a supply of water and having an outlet for discharging water;
    a water tank on the frame located to receive water from the outlet of said reservoir;
    flow control means for controlling the passage of water through said outlet in a manner to substantially maintain a preselected water level in said tank;
    conduit extending from said tank to said heating well to deliver water to the latter;
    said reservoir is substantially airtight;
    said flow control means includes a mouth portion of said outlet terminating in said water tank and providing the sole access for air to enter said reservoir to displace water therein, whereby water is able to flow through said outlet only when said mouth portion is above the water level in the tank;
    heating means associated with said heating well for heating the water therein to substantially the boiling temperature, thereby effecting overflow of hot water out of said well;
    a downwardly inclined surface on said frame located to receive the hot water overflowing said heating well;
    a spout opening in said surface for discharging hot water therefrom in a generally downwardly direction;
    a carafe for receiving coffee located generally beneath said spout opening; and
    a container for coffee grounds located between said spout opening and carafe to receive hot water from said opening and direct coffee into the carafe.

4. A machine for brewing coffee and the like, comprising:
- a frame;
- a heating well supported on said frame;
- means for supplying water to said heating well;
- heating means associated with said heating well for heating the water therein to substantially the boiling temperature, thereby effecting overflow of hot water out of said well;
- a downwardly inclined surface on said frame located to receive the hot water overflowing said heating well;
- a spout opening in said surface for discharging hot water therefrom in a generally downwardly direction;
- a carafe for receiving coffee located generally beneath said spout opening;
- a container for coffee grounds located between said spout opening and carafe to receive hot water from said opening and direct coffee into the carafe;
- a water reservoir adapted for installation on said frame and removable therefrom, and means for delivering water from said reservoir to said heating well when the reservoir is installed on the frame; and
- said heating well and inclined surface being located on the frame at positions open to view and physical access with said reservoir removed from the frame.

5. A machine for brewing coffee and the like, comprising:
- a frame;
- a heating well supported on said frame;
- means for supplying water to said heating well;
- heating means associated with said heating well for heating the water therein to substantially the boiling temperature, thereby effecting overflow of hot water out of said well;
- a downwardly inclined surface on said frame located to receive the hot water overflowing said heating well;
- a spout opening in said surface for discharging hot water therefrom in a generally downwardly direction;
- a carafe for receiving coffee located generally beneath said spout opening;
- a container for coffee grounds located between said spout opening and carafe to receive hot water from said opening and direct coffee into the carafe; and
- a spreader member disposed on said container to spread out the hot water entering the container, said spreader member presenting a generally flat, horizontal surface disposed below said spout opening and an upstanding barrier on said flat surface restricting the flow of water outwardly thereon, said flat surface presenting a plurality of spaced apertures for delivering water into said container.

6. The invention set forth in claim 5, including a ring member projecting generally downwardly from the underside of said spreader member at a location outwardly of each aperture.

7. A machine for brewing coffee and the like comprising:
- a frame;
- a heating well supported on said frame;
- means for supplying water to said heating well;
- heating means associated with said heating well for heating the water therein to substantially the boiling temperature, thereby effecting overflow of hot water out of said well;
- a downwardly inclined surface on said frame located to receive the hot water overflowing said heating well;
- a spout opening in said surface for discharging hot water therefrom in a generally downwardly direction;
- a carafe for receiving coffee located generally beneath said spout opening;
- a container for coffee grounds located between said spout opening and carafe to receive hot water from said opening and direct coffee into the carafe; and
- a flat warming plate for supporting said carafe and means for heating said warming plate, said carafe comprising a non-metallic body and a metal bottom section secured to said body for contact with said warming plate.

8. The invention set forth in claim 7, including an upstanding ring on said warming plate, said metal bottom section presenting a flat, circular underside adapted to seat flushly on said warming plate closely within said ring.

9. Liquid heating apparatus comprising:
- a frame;
- a heating well supported on said frame;
- means for supplying liquid to said heating well;
- heating means associated with said heating well for heating the liquid therein to substantially the boiling temperature, thereby effecting overflow of hot liquid out of said well;
- a downwardly inclined surface on said frame located to receive the hot liquid overflowing said heating well;
- a spout opening in said surface for discharging hot liquid therefrom in a generally downwardly direction;
- a reservoir on said frame adapted to receive a supply of liquid and having an outlet for discharging liquid;
- a tank on the frame located to receive liquid from the outlet of said reservoir;
- flow control means for controlling the passage of liquid through said outlet in a manner to substantially maintain a preselected liquid level in said tank; and
- a conduit extending from said tank to said heating well to deliver liquid to the latter.

10. Apparatus as set forth in claim 9, wherein said flow control means includes:
- a float member in said tank operable to detect when the liquid level in the tank is at said preselected level; and
- valve means substantially closing the outlet of said reservoir when said float member detects a liquid level in the tank at said preselected level.

11. Apparatus as set forth in claim 10, wherein: said float member is mounted in said tank for pivotal movement about a generally horizontal axis and is normally disposed in a stable position whrein said valve means acts to maintain said outlet open to flow;
- said float member includes means providing more buoyancy on one side of said axis than on the other side thereof, whereby said float pivots away from its stable position when the liquid level in said tank is at said preselected level; and said valve means acts to substantially close said outlet in response to pivotal movement of said float member away from its stable position.

12. Apparatus as set forth in claim 9, wherein:
said reservoir is substantially sealed; and
said flow control means includes a mouth portion of said outlet terminating in said tank and providing the sole access for air to enter said reservoir to displace liquid therein, whereby liquid is able to flow through said outlet only when said mouth portion is above the liquid level in the tank to provide air entry into the reservoir.

* * * * *